United States Patent [19]
Bastin et al.

[11] Patent Number: 6,051,624
[45] Date of Patent: Apr. 18, 2000

[54] POLYOL COMBINATION

[75] Inventors: Benoit Etienne Jean-Marie Ghislain Bastin; Mark Maria Herman Alma Boelens, both of Louvain-la-Neuve, Belgium

[73] Assignee: Shell Oil Company, Houston, Tex.

[21] Appl. No.: 09/233,302

[22] Filed: Jan. 19, 1999

Related U.S. Application Data

[62] Division of application No. 09/182,706, Oct. 29, 1998.
[60] Provisional application No. 60/064,369, Oct. 30, 1997.

[51] Int. Cl.[7] .................................................... C08G 18/06
[52] U.S. Cl. .......................... 521/174; 524/366; 524/377; 524/766
[58] Field of Search ............................. 521/174; 524/366, 524/322, 266

[56] References Cited

U.S. PATENT DOCUMENTS

| 5,523,333 | 6/1996 | Fishback et al. | 521/174 |
| 5,684,057 | 11/1997 | White, III et al. | 521/174 |

*Primary Examiner*—Morton Foelak

[57] ABSTRACT

Polyol combination for the preparation of energy absorbing foam is provided, the polyol combination including (a) from 30 to 70 parts by weight of a polyol having a molecular weight in the range of from 2500 to 6500, a functionality in the range of from 2.5 to 6 and a primary hydroxyl content of at least 40%, optionally with a polymer stably dispersed therein; and (b) from 70 to 30 parts by weight of a rigid polyol having a molecular weight in the range of from 300 to 1000, a functionality in the range of from 2.5 to 6 and a hydroxyl value in the range of from 200 to 600, to a total of 100 parts by weight of (a) and (b). Using this combination, foams with a density of less than 50 kg/m$^3$ are possible.

3 Claims, No Drawings

POLYOL COMBINATION

RELATED APPLICATIONS

This is a division of application Ser. No. 09/182,706 filed Oct. 29, 1998, the entire disclosure of which is hereby incorporated by reference.

This application claims priority to provisional application Ser. No. 60/064,369 filed Oct. 30, 1997.

FIELD OF THE INVENTION

The present invention concerns a polyol combination for the preparation of energy absorbing foam of low density, the foam itself and shaped articles comprising the foam.

BACKGROUND TO THE INVENTION

Energy absorbing PU foam (sometimes called viscoelastic foam) is a type of flexible polyurethane foam which is characterized by a slow recovery from deformation and a high vibration damping. Such properties permit a widespread use for the foam type in medical, packaging, automotive and sporting goods products.

High resilience, water-blown energy absorbing PU foams are described inter alia, in U.S. Pat. Nos. 4,190,712, 4,116,893, 4,282,330 and 4,212,954. In these proposals a variety of polyol mixtures are suggested which often require specific cross-linking agents to maintain a useful, predominantly open celled foam (open cells give greater flexibility to a foam). The proposed foams also have densities in excess of 80 kg/m$^3$.

In commercial use, the viscoelastic foam sold under the trade name TEMPUR is suggested in British Patent Specification No. 2,290,256 A to find use in mattresses and cushions. The preferred density range for viscoelastic foams for such uses is stated in GB-A-2,290,256 to be 50 to 120 kg/m$^3$. In the Proceedings of the 35th Annual Polyurethane Technical/Marketing Conference, 1994, pages 661 to 664 in an article entitled "Viscoelastic Slabstock Foam Fundamentals, Properties and Applications", a new foam with trade name SOFTCEL from ARCO Chemical Company is reviewed which is prepared from a specialty polymer polyol, toluene diisocyanate and conventional foam modifier and slabstock intermediates with an additional reinforcing polymer polyol if variation in hardness is required. The prepared foam densities range from 2 pcf to above 4 pcf (around 32 to 64 kg/m$^3$ or higher).

Low density energy absorbing foams, foams having less than 50 kg/m$^3$, are commercially attractive, retaining good hardness and hysteresis in a low resilience energy absorbing foam while requiring less raw material than higher density foams.

SUMMARY OF THE INVENTION

The present invention provides a polyol combination for the preparation of energy absorbing foam which comprises, to a total of 100 parts by weight, (a) from 30 to 70 parts by weight of a polyol having a molecular weight in the range of from 2500 to 6500, a functionality in the range of from 2.5 to 6 and a primary hydroxyl content of at least 40%, optionally with a polymer stably dispersed therein; in conjunction or association with (b) from 70 to 30 parts by weight of a rigid polyol having a molecular weight in the range of from 300 to 1000, a functionality in the range of from 2.5 to 6.0 and a hydroxyl value in the range of from 200 to 600.

Using the polyol combination of the invention it is possible to obtain energy absorbing foams having a density of less than 50 kg/m$^3$.

For the purpose of the present invention a specific polyol a) is used, which polyol has to meet certain specific requirements: a high molecular weight in the range of from 2,500 to 6,500, a functionality (Fn) in the range of from 2.5 to 6 and a primary hydroxyl content of at least 40%.

Preferred polyols are those having in addition an ethylene oxide content in the range of from 5 to 50% by weight, preferably from 10 to 30% by weight and more preferably 15 to 25% by weight. It has been found particularly advantageous to use polyols having a molecular weight in the range of from 4,000 to 6,000, and a primary hydroxy content in the range of from 50 to 100%, more preferably from 70 to 95%. Very suitable polyols, which are commercially available, are CARADOL MC 36-03, CARADOL MC 27-03 and CARADOL SA 36-01 (CARADOL is a trade mark).

DESCRIPTION OF A PREFERRED EMBODIMENT

Good results have been achieved when a polymer polyol having the polyol a) as a base polyol, has been utilized. In general, a polymer polyol is a dispersion of a solid polymer in a liquid polyol. Such systems are well known in the art and are normally prepared by polymerizing one or more ethylenically unsaturated monomers in the presence of a free radical catalyst. Examples of such polymer polyol systems and methods for their preparation are disclosed in, for example, European Patent Specifications Nos. 0,076,491; 0,343,907 and 0,495,551. Polyurea or polyurethane polymers are also known to be useful as the dispersed polymer in polymer polyols instead of the polymers based on ethylenically unsaturated monomers. The polymer dispersed in the base polyol, may in principle be any such polymer known to be applicable for this purpose. Thus, suitable polymers include the polymers based on ethylenically unsaturated monomers and particularly polymers of vinyl aromatic hydrocarbons, like styrene, alpha-methyl styrene, methyl styrene and various other alkyl-substituted styrenes. Of these, the use of styrene is preferred. The vinyl aromatic monomer may be used alone or in combination with other ethylenically unsaturated monomers, such as acrylonitrile, methacrylonitrile, vinylidene chloride, various acrylates and conjugated dienes like 1,3-butadiene and isoprene. Preferred polymers, however, are polystyrene and styrene-acrylonitrile (SAN) copolymers. Another suitable class of polymers are the polyurea and polyurethane polymers. Particularly the condensation products of primary amines or polyhydric alcohol amines and aromatic diisocyanates are very useful in this respect. A very much preferred polymer is the condensation product of triethanolamine and toluene diisocyanate (TDI). The dispersed polymer is suitably present in an amount of from 5 to 40% by weight based on total weight of polymer polyol. Where the polymer is polystyrene or a SAN polymer, preferred solids amounts are in the range of from 10 to 35% by weight, whilst in the case of polyurea polyurethane polymers the preferred amount of polymer is from 5 to 20% by weight.

Examples of some commercially available polymer polyol compositions which may be suitably applied as polyol component (a) of the polyol formulation according to the present invention, are described in International patent specification No. WO 95/09886. Examples, then, include the polyurethane polyols CARADOL SP50-01 and DESMOPHEN 7652, and also the polystyrene polyols CARADOL MD25-01 and CARADOL MD30-01 (CARADOL and DESMOPHEN are trade marks).

The polyol used as polyol component (b) is a rigid polyol of a relatively low functionality and molecular weight. The polyol is required to have a molecular weight in the range of from 300 to 1000, preferably 500 to 700, a functionality in the range of from 2.5 to 6, preferably from 2.5 to 3.5, and a hydroxyl value in the range of from 200 to 600.

The rigid polyol is most suitably 100% propylene oxide without any ethylene oxide content.

Commercially available rigid polyols which may be used as component (b) include CARADOL GB 250-01.

The two polyol components (a) and (b) may be used in conjunction one with the other or combined as a polyol blend in the preparation of energy absorbing foam. Additionally a blowing agent may be combined in such a polyol blend. While any conventional blowing agent may be used, water has become the predominant blowing agent for energy absorbing foams. It is preferable to have in the range of from 1 to 4 parts by weight of water per 100 parts by weight of combined polyols (a) and (b). With alteration of the water content, the density of the foam also alters. High water contents permit a lower foam density.

In addition to the polymer polyol, the rigid polyol, and water, the polyol formulation may contain additional components and auxiliaries useful in the production of flexible polyurethane foams. For instance, the polyol formulation could additionally comprise a foaming catalyst and/or a cross-linking agent. Auxiliaries like fillers, flame retardants, foam stabilizers, and colorants may be present as well. Conveniently, the polyol formulation further comprises ("php" refers to the amount in parts by weight per 100 parts by weight of polyol a) plus rigid polyol b): (c) 0.01 to 2 php of a polyurethane catalyst; and (d) 0 to 3.0 php of a cross-linking agent.

Polyurethane catalysts are known in the art and include many different compounds. An extensive list of polyurethane catalysts is, for instance, given in U.S. Pat. No. 5,011,908. For the purpose of the present invention, however, it has been found particularly advantageous to use both an amine catalyst and a tin catalyst. Tin catalysts include tin salts and dialkyl tin salts of carboxylic acids, such as stannous octoate, stannous oleate, dibutyltin dilaureate, dibutyltin acetate and dibutyltin diacetate. Of these stannous octoate and dibutyltin dilaureate are most frequently applied. The tin catalyst most preferably applied for the purpose of the present invention is stannous octoate, as this catalyst has been found to result in a flexible foam having excellent properties, particularly in terms of resilience and density. In addition to the tin catalyst, one or more tertiary amine catalysts may also be applied. Such tertiary amine catalysts are widely used and include, for instance, bis(2,2'-dimethyl-amino)ethyl ether, trimethylamine, triethylamine, triethylenediamine and dimethylethanolamine. Examples of commercially available tertiary amine catalysts are those sold under the trade names NIAX, TEGOAMIN and DABCO (all trade marks). The catalyst is typically used in an amount of from 0.01 to 2.0 php. Preferred total amounts of catalyst are from 0.05 to 1.0 php.

The use of cross-linking agents in the production of polyurethane foams is well known. Polyfunctional glycol amines are known to be useful for this purpose. The polyfunctional glycol amine which is most frequently used is diethanolamine, often abbreviated as DEOA. If used at all, the cross-linking agent is applied in amounts up to 3.0 php, for example from 0.2 to 1.5 php. However, it is a special feature of the present invention that no separate cross linking agent need be used to ensure good foam formation.

In addition, other well known auxiliaries, such as flame retardants, foam stabilizers (surfactants) and fillers may also be used. Organosilicone surfactants are most conventionally applied as foam stabilizers in polyurethane production. A large variety of such organosilicone surfactants is commercially available. Usually, such foam stabilizer is used in an amount of up to 5% by weight based on the reaction mixture of polyol reactant and polyisocyanate reactant.

The polyol formulation according to the present invention is very useful for preparing energy absorbing polyurethane foams. In order to prepare such flexible foam the polyol formulation is reacted with a polyisocyanate whereby the isocyanate index (i.e. the equivalence ratio of isocyanate groups to hydroxyl groups) has a value in the range of from 70 to 120. Very good results have been obtained by reacting the polyol formulation and the polyisocyanate in such amounts that the isocyanate index is in the range of from 75 to 115.

Accordingly, the present invention also provides an energy absorbing polyurethane foam obtainable by foaming a composition comprising a polyol combination of the present invention and a polyisocyanate component. Where a polyol formulation is used that only contains the polyol a) and the rigid polyol b), then catalyst, optional cross-linking agent, blowing agent and, if desired or deemed necessary, foam stabilizers and other auxiliaries, should be added separately to the polyol formulation, the polyisocyanate or the reaction mixture containing both. Hence, the composition from which the foam is eventually produced, suitably contains the following components: (a) 30 to 70 pbw of a polyol a) as defined above; (b) 70 to 30 pbw, up to a total of 100 pbw, of a rigid polyol b) as defined above; (c) 0.01 to 1.0 php of a tin catalyst, preferably stannous octoate; (d) 0 to 1.0 php of a tertiary amine catalyst; (e) 1 to 4 php of water as the blowing agent; (f) up to 5% by weight of the total composition of an organosilicone foam stabilizer; (g) optionally other auxiliaries; and (h) a polyisocyanate component in such amount that the isocyanate index is in the range of from 70 to 120.

Of these components, components (a) and (b) may be present in a polyol formulation of the present invention, while one or more of the components (c) to (g) may also be present in such a polyol formulation.

Polyisocyanates that may be used are those conventionally applied in the production of flexible polyurethane foams. Useful polyisocyanates should contain at least two isocyanate groups and include both aliphatic -usually alkylene- and aromatic di-, tri-, tetra- and higher isocyanates known in the art to be suitably applied in the production of flexible polyurethane foams. Mixtures of two or more of such aliphatic and/or aromatic polyisocyanates may also be applied. Examples of suitably polyisocyanates, then, include 2,4-toluene diisocyanate (2,4-TDI), 2,6-TDI, mixtures of 2,4-TDI and 2,6-TDI, 1,5-naphthene diisocyanate, 2,4-methoxyphenyl diisocyanate, 4,4'-diphenylmethane diisocyanate (MDI), 4,4'-biphenylene diisocyanate, 3,3'-dimethyl-4,4'-biphenylene diisocyanate, 3,3'-dimethyl-4,4'-biphenylene diisocyanate and 3,3'dimethyl4,4'-diphenylmethane diisocyanate, 4,4',4"-triphenylmethane triisocyanate, 2,4,6-toluene triisocyanate, 4,4'-dimethyl-2,2', 5,5'-diphenylmethane tetraisocyanate, polymethylene-polyphenylene polyisocyanate and mixtures of two or more of these. Polymeric MDI, a mixture of polyisocyanates with MDI as the main component, may also be used. For the purpose of the present invention it has been found particularly advantageous to use 2,4-TDI, 2,6-TDI or a mixture thereof as the polyisocyanate component. Very good results have been attained with a mixture of 2,4-TDI and 2,6-TDI in a weight ratio 2,4-TDI:2,6-TDI of about 80:20 or 65:35.

These mixtures are commercially available as CARADATE 80 and CARADATE 65 respectively (CARADATE is a trade mark).

The energy absorbing foam of the present invention finds especial use in mattresses and cushioning (particularly for use with the bedridden or hospitalised), packaging and orthopaedic appliances.

In mattresses, cushioning and related items, the energy absorbing foam provides a useful material as it becomes softer under the action of body heat so that it takes the shape of the body and provides improved comfort by distribution of the compression load over the foam. The open celled nature of the foam provides necessary ventilation, and the high hysteresis means that after use, the foam article will gradually (slowly) revert to its original shape.

In packaging, such compression properties are useful to protect contents during transport. Furthermore, the proportions of the two polyol components can be adjusted such that the foam becomes less resilient and thus more useful for such an end-use.

In orthopaedic appliances the compression and shape recovery are particularly useful for muscle exercise equipment.

Other uses of the foam of the invention include protective clothing for motorcyclists, helmets, and sound absorbing items such as ear plugs.

The present invention therefore includes shaped articles comprising the energy absorbing foam of the invention, for example cushions for invalid chairs, and mattresses formed of a composite foam having, as a surface layer, the energy absorbing foam of the invention.

The invention will now be illustrated by the following Examples.

EXAMPLES 1 TO 8

In the following Examples:

Polyol A is a polymer polyol containing 10% by weight polystyrene solids in a base polyol having a molecular weight of 4700, a primary hydroxyl content of 80% and a hydroxyl value of 36 mg KOH/g polyol, a functionality of 3 and an ethylene oxide content of 13% by weight;

Polyol B is a polymer polyol containing 17.5% by weight polystyrene solids in the same base polyol as polyol A;

Polyol C is a rigid polyol having a molecular weight of 675, a hydroxyl value of 250 mg KOH/g polyol, and a functionality of 3, and contains 100% propylene oxide;

Isocyanate D is CARADATE 65, a 65/35 weight % mixture of 2,4 and 2,6 toluene diisocyanate;

Isocyanate E is CARADATE 80, an 80/20 weight % mixture of 2,4 and 2,6 toluene diisocyanate (CARADATE is a trade mark).

Foams were prepared by conventional procedures from Polyol A or B plus Polyol C by reaction with Isocyanate D or E using water as a blowing agent, and with conventional catalysts Niax B2 (a mixture of 2 tertiary amines) and tin catalyst Dabco T9 (stannous octoate) from Air Products, and a conventional organosilicone foam stabilizer, Tegostab B 4900, available from Thomas Goldschmidt. (Niax, Dabco and Tegostab are trade names).

Variation in polyol ratios, isocyanate index, isocyanate type, and water content were investigated. All combinations were found to give energy absorbing foam of low density (less than 50 kg/m$^3$), with good hardness and hysteresis properties.

Full details are given in Table 1 below.

TABLE 1

| Component | Example No. | | | | | | | |
|---|---|---|---|---|---|---|---|---|
| | 1 | 2 | 3 | 4 | 5 | 6 | 7 | 8 |
| Polyol A (pbw) | 50 | 70 | 65 | — | — | — | — | — |
| Polyol B (pbw) | — | — | — | 60 | 50 | 40 | 60 | 60 |
| Polyol C (pbw) | 50 | 30 | 35 | 40 | 50 | 60 | 40 | 40 |
| Isocyanate D (Isocyanate Index) | 95 | 105 | 85 | 115 | 75 | 85 | — | — |
| Isocyanate E (Isocyanate (Index) | — | — | — | — | — | — | 85 | 85 |
| Water (pbw) | 1.8 | 1.8 | 1.8 | 1.8 | 1.8 | 1.8 | 2.8 | 3.8 |
| Niax B2 (pbw) | 0.25 | 0.25 | 0.25 | 0.25 | 0.25 | 0.25 | 0.20 | 0.20 |
| Dabco T9 (pbw) | 0.16 | 0.16 | 0.30 | 0.06 | 0.20 | 0.12 | 0.08 | 0.08 |
| Tegostab B4900 (pbw) | 0.80 | 0.80 | 0.80 | 0.80 | 0.80 | 0.80 | 0.80 | 0.80 |
| Foam Properties | | | | | | | | |
| Density* (kg/m$^3$) | 47 | 47 | 49 | 47 | 45 | 45 | 35 | 25 |
| Hardness** (kPa) | 3.6 | 4.4 | 2.1 | 4.7 | 1.3 | 1.6 | 2.6 | 2.5 |
| Hysteresis** (%) | 47 | 40 | 31 | 54 | 34 | 35 | 57 | 62 |

*measured in accordance with ASTM 3574-77
**measured in accordance with DIN 53577

EXAMPLES 9 AND 10

Foams were prepared in analogous manner as for Examples 1 to 8, using in place of polyol A or polyol B, one of the following polyols in combination with Polyol C.

Polyol F is a polyol having a molecular weight of 4700, a primary hydroxyl content of 80% and a hydroxyl value of 36 mg KOH/g polyol, a functionality of 3 and an ethylene oxide content of 13% by weight; and Polyol G is a polyol having a molecular weight of 6200, a primary hydroxyl content of 82% and a hydroxyl value of 27 mg KOH/g polyol, a functionality of 3 and an ethylene oxide content of 14% by weight.

Full details are given in Table 2 below. Again foams of low density with good hardness and hysthysteresis properties were achieved.

TABLE 2

| | Example No. | |
|---|---|---|
| Component | 9 | 10 |
| Polyol F (pbw) | 50 | — |
| Polyol G (pbw) | — | 50 |
| Polyol C (pbw) | 50 | 50 |
| Isocyanate D (Isocyanate Index) | 95 | 95 |
| Water (pbw) | 1.8 | 1.8 |
| Niax B2 (pbw) | 0.35 | 0.35 |

TABLE 2-continued

| | Example No. | |
|---|---|---|
| Component | 9 | 10 |
| Dabco T9 (pbw) | 0.16 | 0.18 |
| Tegostab B4900 (pbw) | 0.80 | 0.80 |
| Foam Properties | | |
| Density* (kg/m³) | 49 | 48 |
| Hardness** (kPa) | 2.5 | 3.0 |
| Hysteresis** (%) | 42 | 53 |

*measured in accordance with ASTM 3574-77
**measured in accordance with DIN 53577

We Claim:

1. A polyurethane foam comprising the reaction product of:
   a polyol combination, the polyol combination comprising:
   (a) from 30 to 70 parts by weight of a polyol having a molecular weight in the range of from 2500 to 6500, a functionality in the range of from 2.5 to 6 and a primary hydroxyl content of at least 40%, and
   (b) from 70 to 30 parts by weight of a rigid polyol having a molecular weight in the range of from 300 to 1000, a functionality in the range of from 2.5 to 6 and a hydroxyl value in the range of from 200 to 600, to a total of 100 parts by weight of (a) and (b);
   an isocyanate component having an isocyanate index in the range of from 70 to 120;
   water in an amount in the range of from 1 to 4 parts by weight per 100 parts by weight of polyol combination; and
   a catalyst.

2. The foam of claim 1, wherein no separate cross-linking component is included.

3. A process for the preparation of an energy absorbing foam, the process comprising the steps of:
   combining (a) from 30 to 70 parts by weight of a polyol having a molecular weight in the range of from 2500 to 6500, a functionality in the range of from 2.5 to 6 and a primary hydroxyl content of at least 40%, (b) from 70 to 30 parts by weight of a rigid polyol having a molecular weight in the range of from 300 to 1000, a functionality in the range of from 2.5 to 6 and a hydroxyl value in the range of from 200 to 600, such that a total of 100 parts by weight of polyol is utilized,
   (c) a polyisocyanate having an isocyanate index in the range of from 70 to 120, (d) water in an amount in the range of from 1 to 4 parts by weight per 100 parts of total polyol, and (e)
   a catalyst; and
   recovering an energy absorbing foam.

* * * * *